United States Patent [19]

Bolt

[11] 4,060,380

[45] Nov. 29, 1977

[54] FURNACE HAVING BURNERS SUPPLIED WITH HEATED AIR

[75] Inventor: James S. Bolt, Rockford, Ill.

[73] Assignee: Alco Standard Corporation, Valley Forge, Pa.

[21] Appl. No.: 696,062

[22] Filed: June 14, 1976

[51] Int. Cl.² ............................................. F27D 17/00
[52] U.S. Cl. .................................... 432/179; 431/351; 432/222
[58] Field of Search ............... 432/222, 175, 176, 179, 432/223; 431/351, 348

[56] References Cited

U.S. PATENT DOCUMENTS

| 2,762,618 | 9/1956  | Johnson et al. ............ | 432/179 X |
| 3,022,815 | 2/1962  | Bloom et al. ............... | 431/348   |
| 3,247,884 | 4/1966  | McFadden et al. .......... | 431/351   |
| 3,267,984 | 8/1966  | Reed et al. ................. | 431/348   |
| 3,476,368 | 11/1969 | Saiki .......................... | 432/179 X |
| 3,583,691 | 6/1971  | Twine ......................... | 432/175   |
| 3,843,317 | 10/1974 | Remmey ..................... | 432/176   |

*Primary Examiner*—John J. Camby
*Attorney, Agent, or Firm*—Leydig, Voit, Osann, Mayer and Holt, Ltd.

[57] ABSTRACT

The hot flue gas expelled from a furnace is used to heat air which is supplied to the burners that fire the furnace. The heated air is delivered to each burner through its ceramic burner block rather than through its cast iron burner body so as to avoid the need of making the body out of expensive alloys capable of withstanding high temperatures.

6 Claims, 3 Drawing Figures

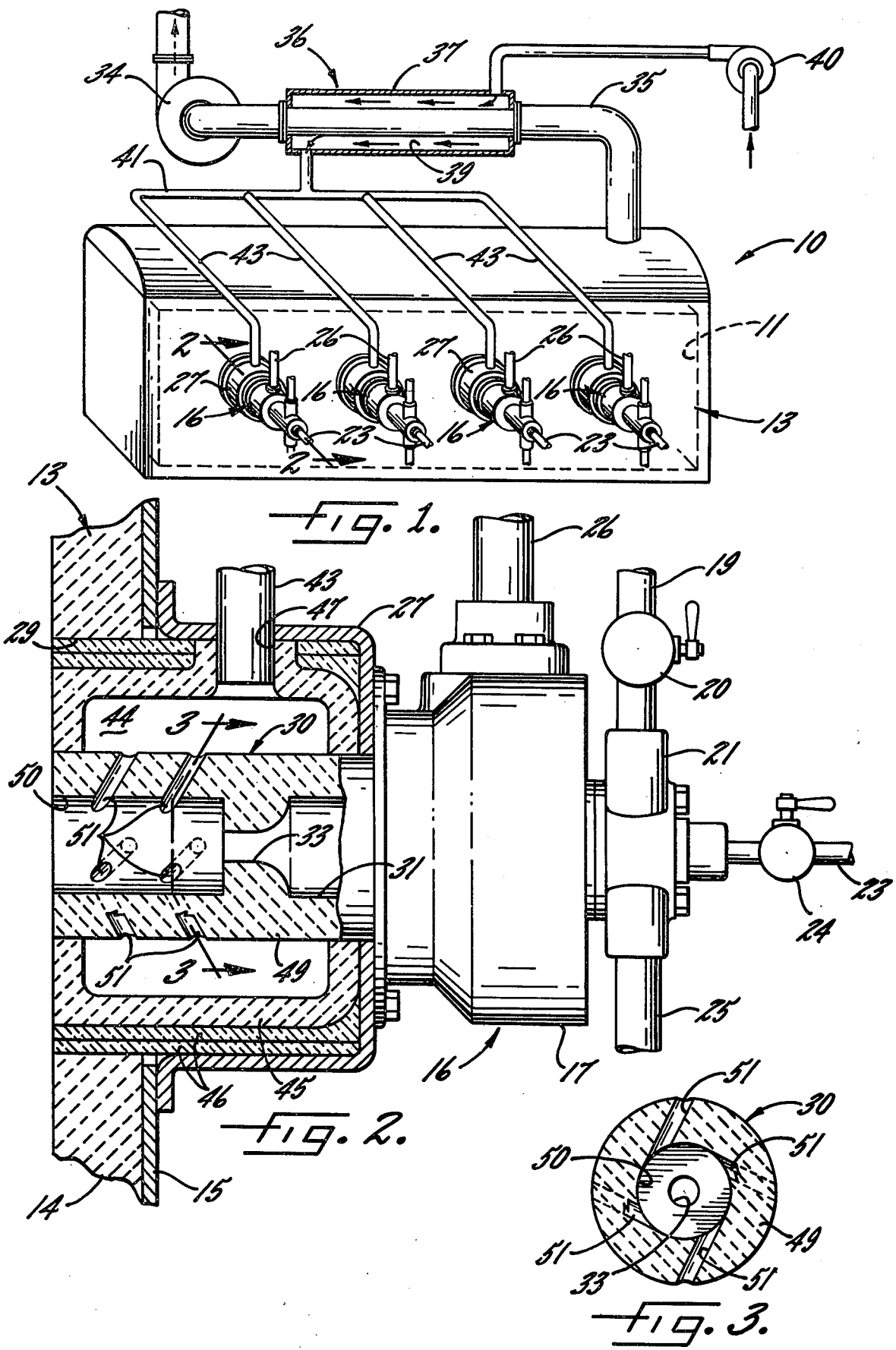

FURNACE HAVING BURNERS SUPPLIED WITH HEATED AIR

BACKGROUND OF THE INVENTION

This invention relates to a furnace having a walled enclosure defining a heating chamber which is adapted to be heated by at least one burner supported by the enclosure and operable to direct a flame into the chamber. A typical burner includes a tubular metallic body adapted to mix and ignite a flow of fuel and combustion air to produce the flame. For the most part, the flame is initially produced within a tubular burner block made of ceramic or other non-metallic refractory material and attached to the downstream end of the burner body. The burner block is capable of withstanding extremely high temperatures and usually is formed with a constricted nozzle for shaping the flame and increasing the velocity thereof.

All of the heat produced in the heating chamber cannot be conserved and used and thus a substantial amount of heat escapes from the chamber through the walls of the furnace and via the products of combustion or flue gas expelled from the furnace. It has been found advantageous to utilize this escaping heat to raise the temperature of the air which is supplied to the burner. One arrangement for achieving this is disclosed in Twine U.S. Pat. No. 3,583,691 wherein heat escaping from the furnace chamber is used to preheat the combustion air supplied to the burner.

SUMMARY OF THE INVENTION

The primary aim of the present invention is to provide a new and improved furnace in which heat escaping from the heating chamber is used to heat a source of secondary air supplied to the burner, the secondary air being heated to comparatively high temperatures and being introduced into the burner through the high-temperature resistant, ceramic burner block rather than through the metallic burner body so as to avoid the need of making the body out of expensive and difficult-to-fabricate alloys capable of withstanding the high temperatures of the heated secondary air.

A more detailed object is to introduce the preheated secondary air into the burner block at a location such that the secondary air will not adversely interfere with normal combustion of the burner. In the preferred embodiment, this is achieved by forming the burner block with a tubular extension located downstream of the constricted nozzle and by introducing the secondary air into the burner block through the extension.

The invention also resides in the novel formation of passages through the burner block extension to allow the secondary air to enter the burner block, the passages being uniquely arranged to cause the secondary air to mix thoroughly with the flame and to advance the flame out of the burner block with a swirling motion.

These and other objects and advantages of the invention will become more apparent from the following detailed description when taken in conjunction with the accompanying drawings.

BRIEF DESCRIPTION OF THE DRAWINGS

FIG. 1 is a perspective view of an exemplary furnace equipped with new and improved burners embodying the unique features of the present invention.

FIG. 2 is an enlarged fragmentary cross-section taken substantially along the line 2—2 of FIG. 1.

FIG. 3 is a cross-section taken substantially along the line 3—3 of FIG. 2.

DETAILED DESCRIPTION OF THE PREFERRED EMBODIMENT

As shown in the drawings for purposes of illustration, the invention is embodied in a furnace 10 such as kiln for heating workpieces to high temperatures ranging up to 3200 degrees Fahrenheit. Herein, the workpieces are heated within an internal chamber 11 defined by a walled enclosure, one of the walls 13 of which is shown in FIG. 2. Such wall is formed by at least one layer 14 of fire brick or other refractory material and by an outer steel sheet 15.

In order to heat the chamber 11, at least one — and preferably several — burners 16 are supported by the wall 13 of the furnace 10. Herein, four burners are utilized and they are spaced equally along the wall. Each burner includes a tubular burner body 17 (FIG. 2) which, in this particular instance, is of the dual-fuel type sold by Eclipse, Inc. of Rockford, Illinois under the trademark Thermo-jet. Such a body is made of cast iron and is adapted to burn either gaseous fuel or fuel oil. Gaseous fuel may be supplied to the burner through a pipe 19 and an adjustable control valve 20 and is delivered into a housing 21 which is attached to the outer end of the body 17. Oil is adapted to be delivered to the housing 21 by way of a pipe 23 and a control valve 24 while air for atomizing the oil is supplied to the housing through a line 25. Air for supporting combustion of the fuel is delivered into the burner body 17 through a pipe 26 leading radially into the body and connected to a blower (not shown).

The body 17 of each burner 16 is fastened to the outer end of a cup-shaped mounting bracket 27 (FIG. 2) which is attached to the outer side of the wall 13 in alinement with a cylindrical opening 29 formed through the wall. Attached to the inner end of the burner body 16 and centered within the opening 29 is a tubular burner block 30 which is made of ceramic or other non-metallic refractory material capable of withstanding extremely high temperatures. The hot gaseous stream or flame resulting from combustion of the fuel-air mixture is developed within a cylindrical tunnel 31 at the outer end of the burner block 30 and then is reduced in cross-section and increased in velocity by a constricted nozzle 33 located at the outer end of the tunnel. The inner end of the burner block is substantially flush with the inner side of the wall 13 and opens into the heating chamber 11 so that the flame produced by the burner is directed into the chamber to heat the workpieces therein.

Heat which inherently escapes from the chamber 11 is partially recovered and is advantageously used to heat air which is supplied to the burners 16. Herein, such air is heated to high temperatures by the hot products of combustion — commonly referred to as flue gas — expelled from the heating chamber. In the present instance, the flue gas is positively extracted from the chamber by a blower 34 (FIG. 1) connected to a duct 35 which leads into the top of the furnace 10. The duct extends through a heat exchanger 36 formed by a sleeve 37 which surrounds a portion of the duct and which coacts with the duct to define an annular air chamber 39 around the duct. Air is supplied to the air chamber 39 by a blower 40 and is delivered to the burners 16 by way of a manifold 41 and by a series of pipes 43 which extend between the manifold and the burner.

With the foregoing arrangement, the air passing through the air chamber 39 is heated by the hot flue gas flowing through the duct 35 but without the air being mixed with the flue gas. The flow rate of air through the air chamber 39 is relatively low and baffles (not shown) may be provided in the chamber to cause the air to attain a comparatively high temperature prior to being supplied to the burners 16.

In accordance with the present invention, the high temperature air is introduced into each burner 16 through the ceramic burner block 30 rather than through the cast iron burner body 17. As a result, it is not necessary for the burner body to withstand extremely high temperatures and thus the burner body need not be specially manufactured from heat-resistant alloys which not only are expensive in themselves but which also would make the body more difficult and costly to fabricate.

More specifically, the heated air flowing to each burner 16 through the pipe 43 is delivered into an annular compartment 44 (FIG. 2) which surrounds the burner block 30. The compartment 44 is defined by the outer surface of the burner block and by the inner surface and end walls of a ceramic enclosure 45 which is located within the mounting bracket 27 and also within the opening 29 in the wall 13. Layers 46 of ceramic wool or other suitable insulating material surround the outer surface of the ceramic enclosure 45 and are packed into the opening 29 and the mounting bracket 27 as shown in FIG. 2.

The air pipe 43 extends through the mounting bracket 27 and into an opening 47 (FIG. 2) formed through the ceramic enclosure 45 and thus heated air flowing out of the pipe is delivered into the annular compartment 44. In keeping with the invention, the air is delivered into the burner block 30 at a point downstream of the nozzle 33 and thus the air is entrained into the flaming gaseous stream without interfering with the normal combustion occurring within the burner 16 upstream of the exit end of the nozzle.

For this purpose, the burner block 30 is formed with an integral extension 49 located beyond the nozzle and having a cylindrical tunnel 50 whose diameter is larger than that of the exit end of the nozzle and is approximately equal to the diameter of the tunnel 31. Two axially spaced sets of angularly spaced passages 51 are formed through the extension 49 to enable air in the compartment 44 to pass into the tunnel 50. In carrying out the invention, the passages 51 are arranged to mix the heated air thoroughly with the gaseous stream being discharged from the nozzle 33 and to advance the stream out of the end of the tunnel 50. To accomplish this, the passages of each of the two sets are spaced equally around the extension 49 and each passage is located substantially tangent to the tunnel 50 (see FIG. 3). In addition, each passage slants from the upstream end of the tunnel 50 toward the downstream end thereof upon progressing inwardly toward the tunnel. Thus, the passages 51 cause the heated air to swirl within and advance through the tunnel 50 with a substantially helical motion so that the air becomes thoroughly entrained in the hot gaseous stream and helps mix and advance the fuel and combustion air therein.

From the foregoing, it will be apparent that the present invention brings to the art a new and improved furnace 10 in which air heated by the flue gas is introduced into each burner 16 through the ceramic burner block 30 so as to enable the burner body 17 to be made of conventional material and in a conventional manner. In most instances, the preheated air will be delivered to the burners at low pressures and, in some instances, the air will simply be drawn into each burner by the aspirating action produced by the advancing gaseous stream.

I claim:

1. A furnace comprising a walled enclosure defining a heating chamber, a burner supported by said enclosure for heating said chamber, said burner comprising a tubular metallic body adapted to receive fuel and combustion air for producing a hot gaseous stream, a tubular burner block made of non-metallic refractory material and secured to one end of said body for receiving said stream, said burner block having a constricted nozzle for increasing the velocity of said stream and having a tubular extension located downstream of said nozzle, said extension having an interior larger than the downstream end of said nozzle, means defining an annular compartment around said extension, a series of passages formed through and spaced angularly around said extension and establishing communication between said compartment and the interior of said extension, means defining an air chamber located to be heated by heat produced in said heating chamber, and means for establishing communication between said air chamber and said compartment whereby heated air in said air chamber flows into said compartment and through said passages to mix with the hot gaseous stream passing within said extension.

2. A furnace as defined in claim 1 in which the interior of said extension is of substantially circular cross-section, said passages being spaced equally around said extension and extending substantially tangent to the interior of said extension so as to swirl the heated air entering said extension.

3. A furnace as defined in claim 2 in which said passages slant from the upstream end of said extension toward the downstream end thereof upon progressing inwardly so as to cause the heated air to advance out of the downstream end of said extension.

4. A furnace as defined in claim 1 in which said compartment is defined by an annular enclosure telescoped over said extension and made of non-metallic refractory material.

5. A furnace as defined in claim 1 in which said air chamber is located outside of said heating chamber, a duct leading from said heating chamber to said air chamber and operable to deliver products of combustion from said heating chamber past said air chamber without mixing such products with the air in said air chamber, and a blower for forcing air from said air chamber and into said compartment.

6. A furnace comprising a walled enclosure defining a heating chamber, a burner supported by said enclosure for heating said chamber, said burner comprising a tubular body adapted to receive fuel and combustion air for producing a hot gaseous stream, a tubular burner block secured to one end of said body for receiving said stream, said burner block being made of non-metallic refractory material, means defining an annular compartment around said burner block, series of passages formed through and spaced angularly around said burner block and establishing communication between said compartment and the interior of said burner block, means defining an air chamber located to be heated by heat produced in said heating chamber, and means for establishing communication between said air chamber and said compartment whereby heated air in said air chamber flows into said compartment and through said passages to mix with the hot gaseous stream passing within said burner block.

* * * * *